Sept. 10, 1929.         T. KLATT         1,727,434
DEVICE FOR MANUFACTURING TEMPLATES FOR MOLDS FOR
GRINDING DEFORMED SPHERICAL SURFACES
Filed Jan. 6, 1926

Patented Sept. 10, 1929.

1,727,434

UNITED STATES PATENT OFFICE.

THEO KLATT, OF DORTMUND, GERMANY.

DEVICE FOR MANUFACTURING TEMPLATES FOR MOLDS FOR GRINDING DEFORMED SPHERICAL SURFACES.

Application filed January 6, 1926, Serial No. 79,694, and in Germany December 29, 1924.

Since several decades optical science enables us to compute simple lenses and mirror surfaces, which have an absolutely aplanatic effect and are far superior to the existing lens systems. Practical engineering, however, has not yet succeeded, so far, to grind such deformed spherical surfaces to such a degree of accuracy as in the case of purely spherical surfaces. The expedient is used of using callipers and visual observation so as to attain as nearly as possible to the computed result.

The manufacture of concave basins for grinding spherical surfaces is itself known, also the material. In order to prepare concave basins for grinding deformed spherical surfaces, it is necessary to make such templates as will correspond to the deformed lens and mirror surfaces that have been calculated. These templates are derived from the conic sections, and the generatrix of the conical body may be a straight line, a straight line with an arc placed intermediate or put to one or to both ends, or merely an arc alone. The arc may consist of several arcs, in which case the pointed arch may be added concave or convex, the arch at the base in the same way and in a curvature in a different or in the same sense of curvature. The conical body with a straight or not straight generatrix may receive a circular or not circular sectional form, and it is also possible that the two ends of the body are of equal or of different sized basesurfaces. The conic sections, as is well known, develop from the circle form through that of the ellipse into those of the parabola and hyperbola. They may, however, be brought into required and computed form by inserting an arc for the generatrix of the cone, such forms as are required, e. c. for the manufacture of lenses, one side of which is a purely spherical surface and the other side a deformed spherical surface.

According to the present invention the manufacture of such gauges or templates for preparing concave basins for grinding deformed spherical surfaces is performed by fixing and working the gauge plates or template blanks into and in a device formed to represent a conic section corresponding to the shape of the deformed spherical surface.

In the drawing accompanying this specification a modification has been represented by way of example.

Figure 1:
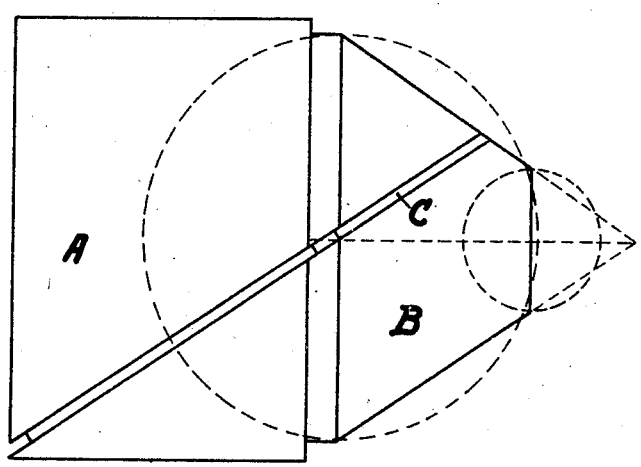
Fig. 1 is a view of the work-holder and work piece.

In Fig. 1 a holder for the piece to be worked A B of any form has been represented with a truncated cone prepared, so as to make, by means of it, an accurate parabolic surface into a template for a concave basin for grinding purpose. To this end the holding device or carrier of the working piece has been cut through parallel to the lower surface of the cone so as to arrange the working piece, the template plate C or several of them in this slit. The carrier of the working piece A and B may be plane or have holding cams on this sectional surface C, which are accurately centered and are in the form of pins, screws, notches or similar, by which the template is held accurately in its correct position during working, and when they are reversed, will be laid again into exactly centered position. The two parts of the working-piece-carrier, after the template plates C have been placed between them, are fixedly screwed together and are now worked together, ground down and polished together. They may, however, be held together also by means of keys, splitpins or rivets, also the conical surface may first be prepared and the templates may be worked subsequently.

Figure 2:
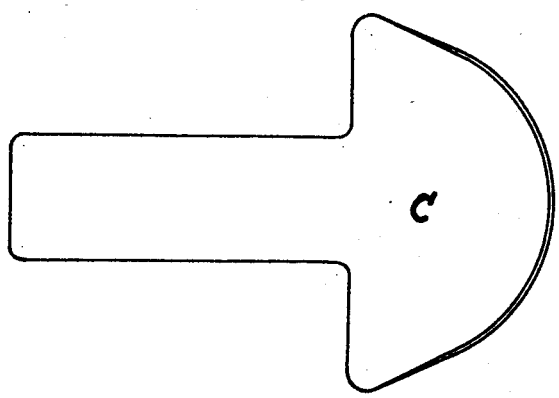
Fig. 2 is a view of the work piece.

Whereas the templates have a one-sided edge with the exception of those made at right angles to the generatrix, which may be easily damaged, they are placed a second time and reversed into the slit C, so that the one-sided edge protrudes from the surface of the cone; now this edge is removed by means of the turning tool, or is ground-off and polished. The template is now ready for use and the edge formed in the middle of the plate corresponds exactly to the accurate outline of the parabolic surface. This sharp and accurate outline of the edge, as well in the case of the one-sided edge as well as of the edge lying in the middle of the plate, warrants convenient and most exact control in the manufacture of concave basins or bruisers for grinding, which may now be done in exactly the same manner as in the case of ordinary spherical surfaces. The finished parabolic surface as a bruiser or template is shown in Fig. 2.

As a matter of course the holding device A is given the required slant C for the templates previous to working the cone surfaces and the part B is made as a covering or fixing plate of uniform thickness or closing up in the form of a wedge. Both parts of the keeping device for the working piece may also be replaced by plates of sufficient strength, which are fixed under the same angle of inclination as is to be given to the templates, and this inclination may be regulated by means of adjusting screws or similar devices. For hollow grinding the cone is worked-out from the working-piece-keeper B and A, the point of the cone lying within the latter, so that the templates C are formed by the remaining wall or shell of the working-piece-keeper parts or of the template plate C.

In manufacturing the gauges or templates for the bruisers or basins for grinding deformed spherical surfaces it is possible, according to the present invention, to fix together the template-plates C and the two parts A and B of the working piece by gluing, cementing or soldering them together. After the entire block has been worked to shape, the template plate is then separated again from the two working pieces in the well known manner. It is advisable to use this method of fixing principally in the case of templates of small dimensions, which do not allow the application of other fixing methods. It is also possible to make the template by fixing the template-plate C to the working piece A alone, and by working it together with this single piece only.

The surfaces of the grinding bruisers or basins for spherical surfaces are ground smooth, as is well known, by moving to and fro the rotating spherical calotte. This method however, can not be applied in the case of deformed spherical surfaces. In order, now, to be able to produce and grind smooth within the grinding bruiser or basin for deformed spherical surfaces an inside surface of sufficient accuracy, a gauge or template is made from very hard material, e. c. from steel, which gauge is fixed in the manner of a cutting edge to the center of a drill. With this curve-drill the grinding bruiser cut from the rough is now turned out so that any grooves or cuts produced will run from the spherical center to the circumference. In this manner it is brought about, that by means of simple centrical and rotary movements of the upper calotte any unevenness arising will be removed and the grinding form will be smoothed by the grinding means arranged in the intermediate space. The edge of the drill may be represented also by a part of the template only. The grinding bruiser or basin may also be ground to a finish by means of the template.

I claim:

A work holder for templates for use in the manufacture of tools for grinding deformed spherical surfaces, comprising a conical block, a base formed on said block, said base and block being divided through said conical block on a plane of any desired conic section, said parts adapted to receive therebetween and to have secured thereto sheet material from which to form a template of the desired spherical contour, and the surfaces of the conical block acting as guides to limit the action of a grinding tool on said sheet material.

In testimony whereof I affix my signature.

THEO KLATT.